Feb. 20, 1940.   W. O. SIMS ET AL   2,190,684
WIRE STITCHING MACHINE
Filed April 7, 1937   7 Sheets-Sheet 1
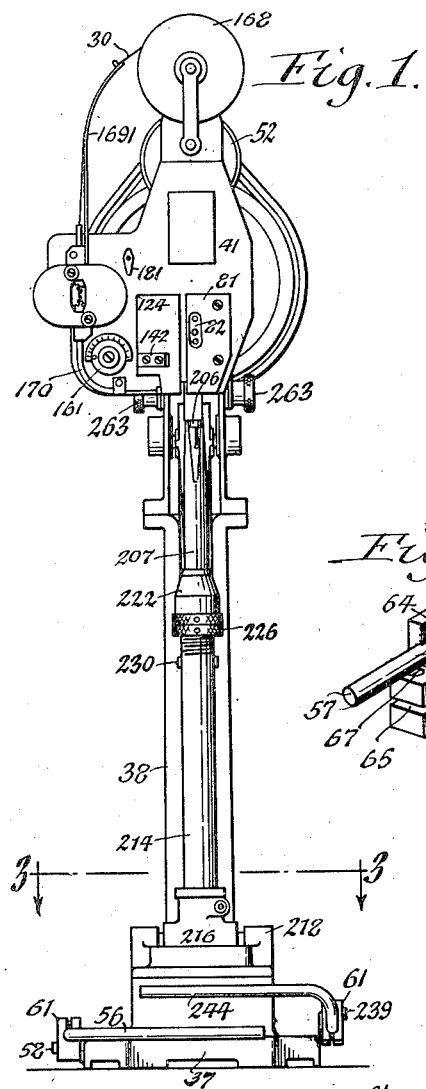
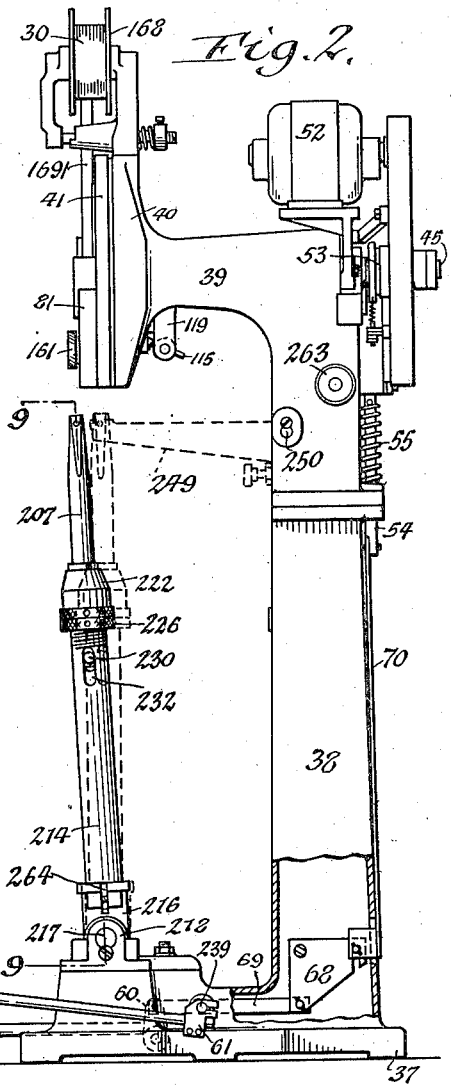
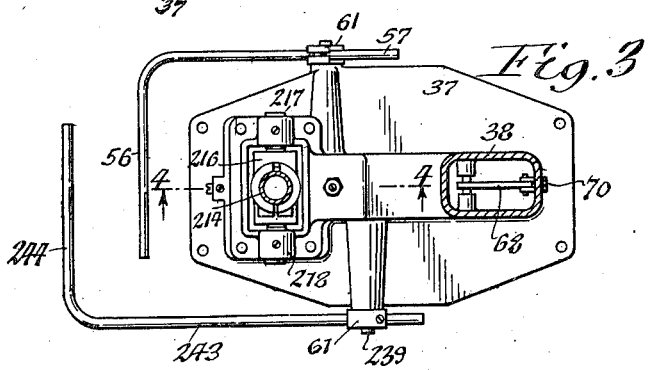
William O. Sims
Edward J. Rodda
INVENTORS
BY
ATTORNEYS Feb. 20, 1940. W. O. SIMS ET AL 2,190,684
WIRE STITCHING MACHINE
Filed April 7, 1937 7 Sheets-Sheet 2
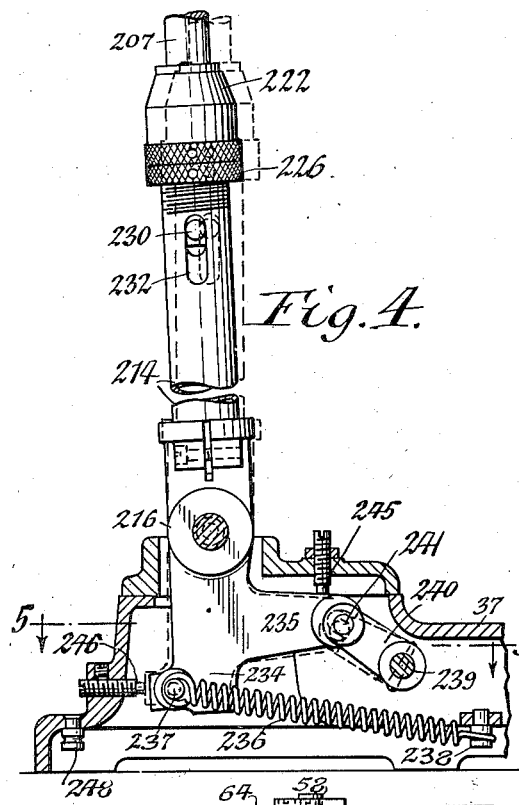
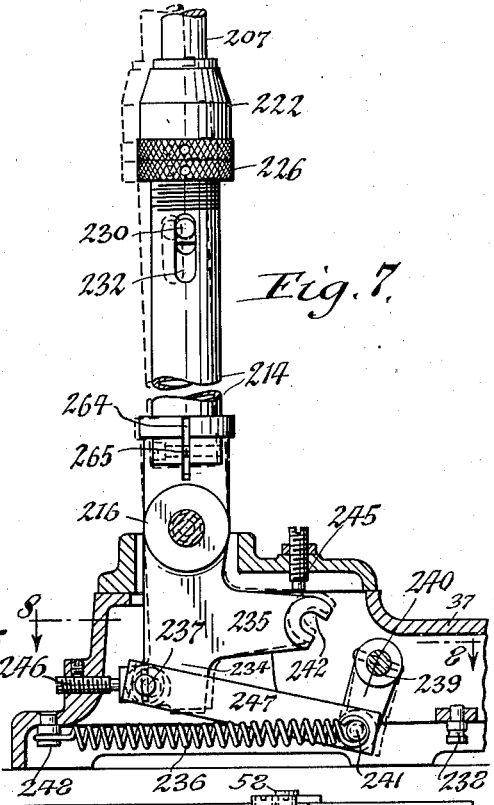
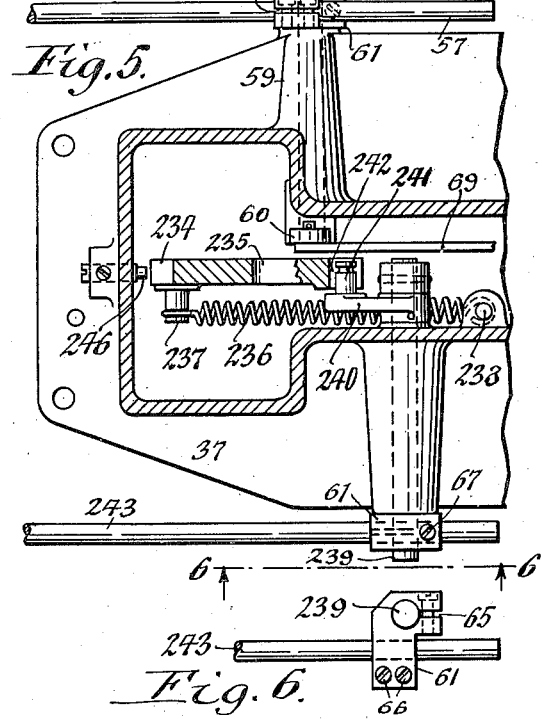
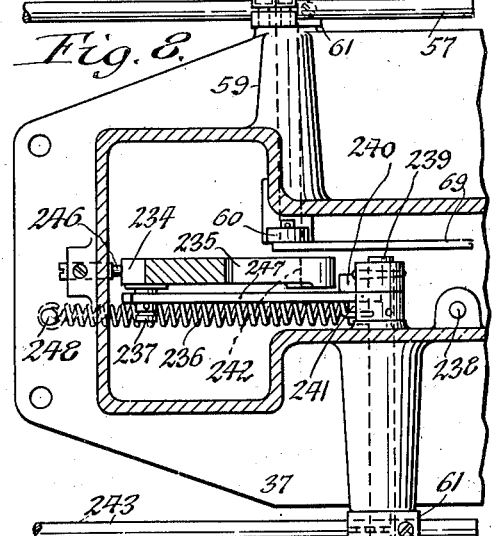
William O. Sims
Edward J. Rodda
INVENTORS
BY
ATTORNEYS

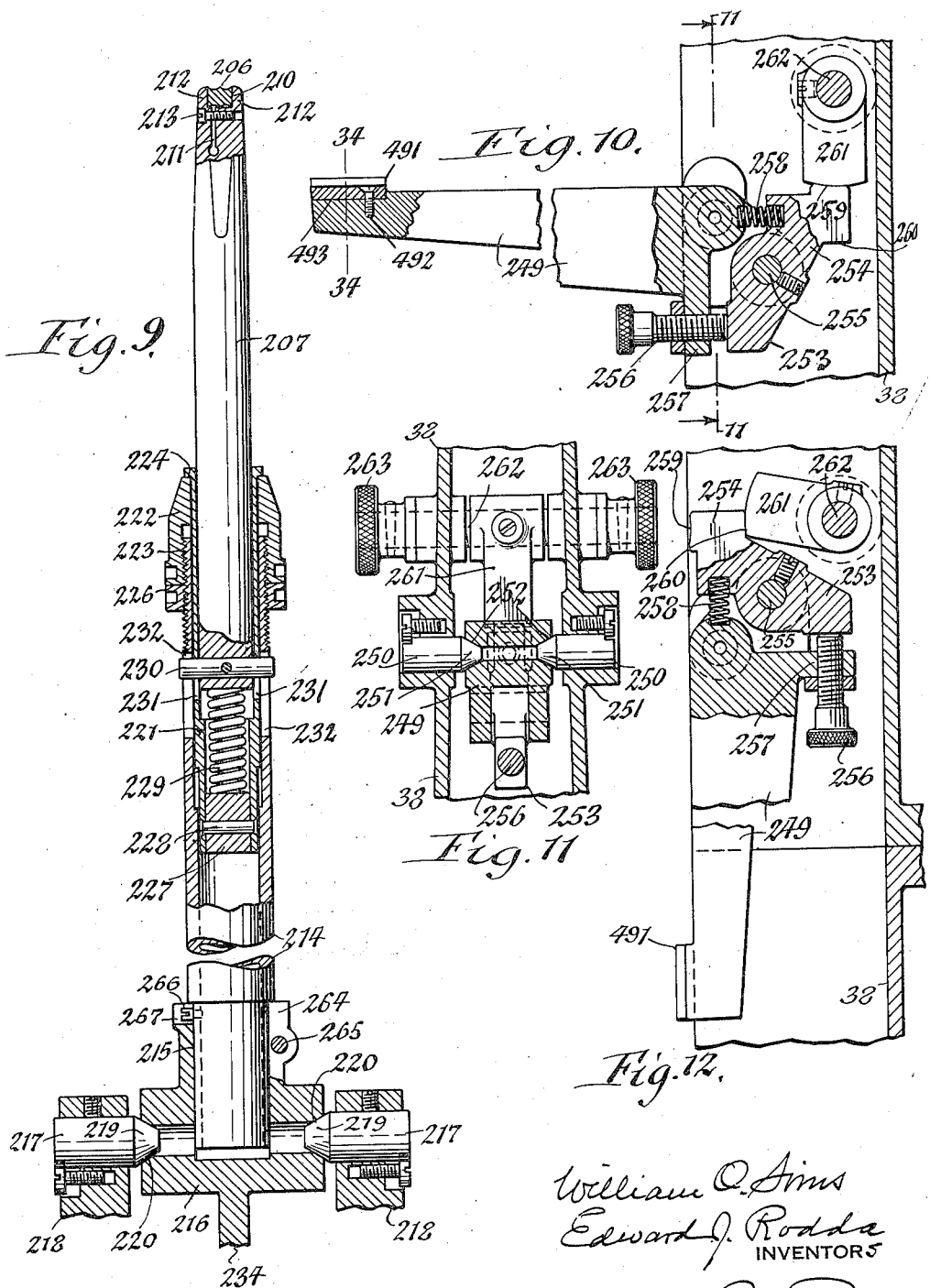

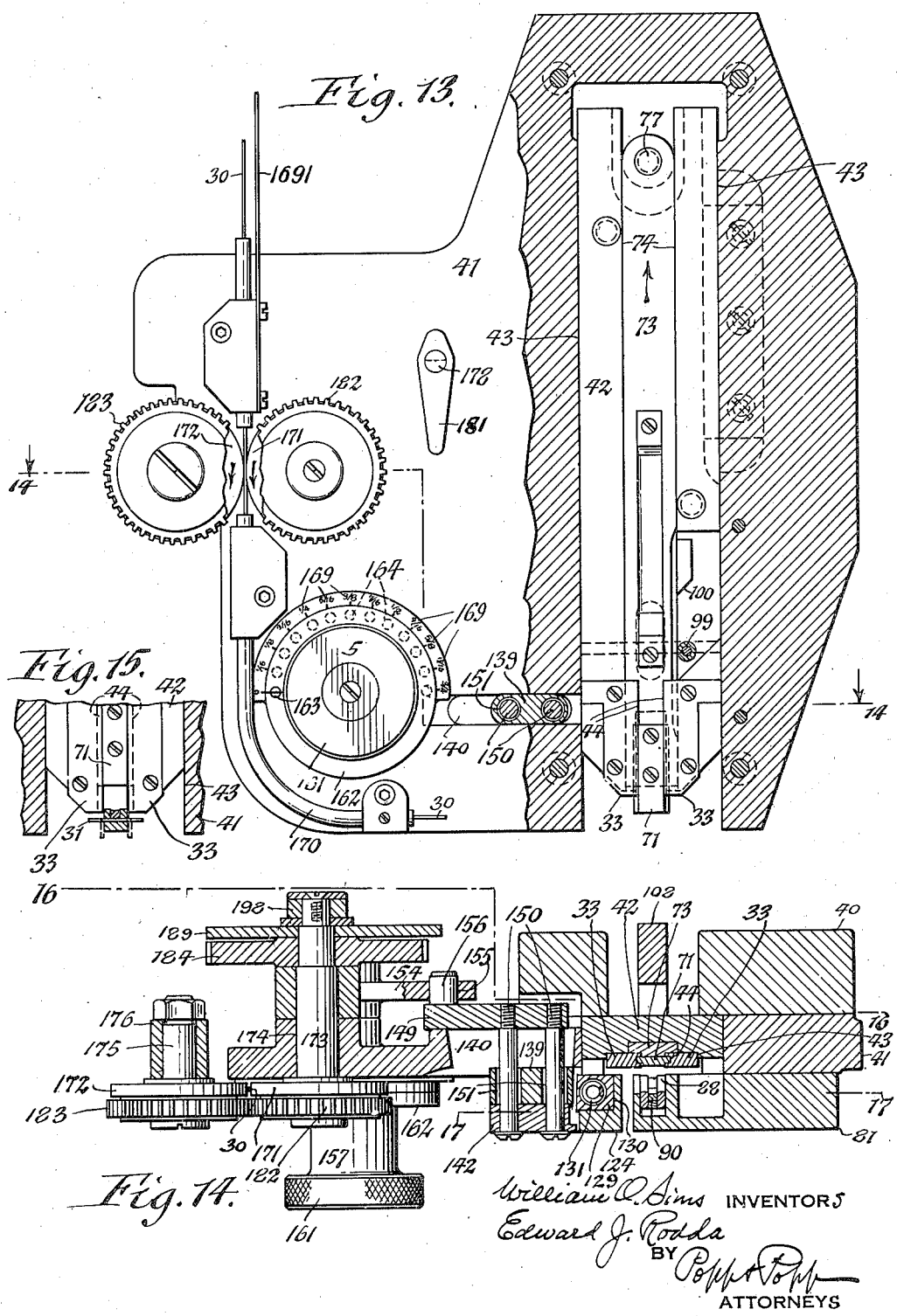

Feb. 20, 1940. W. O. SIMS ET AL 2,190,684
WIRE STITCHING MACHINE
Filed April 7, 1937    7 Sheets-Sheet 5
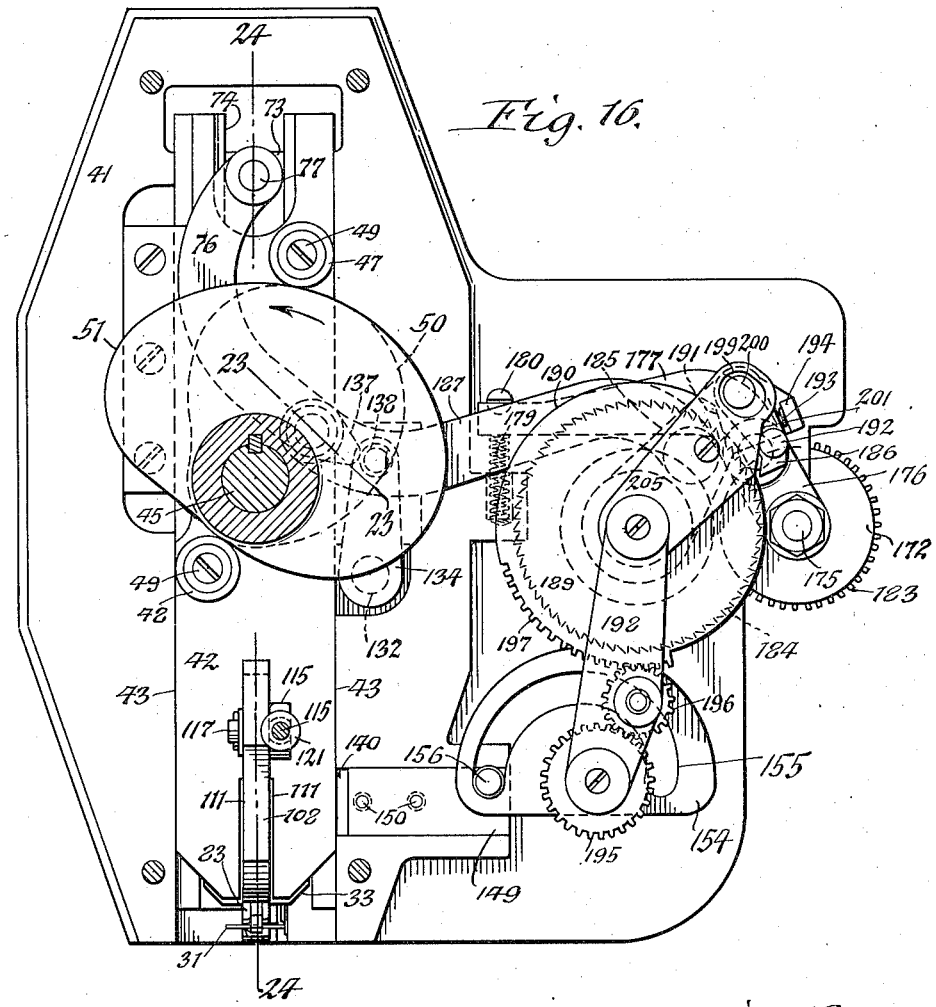
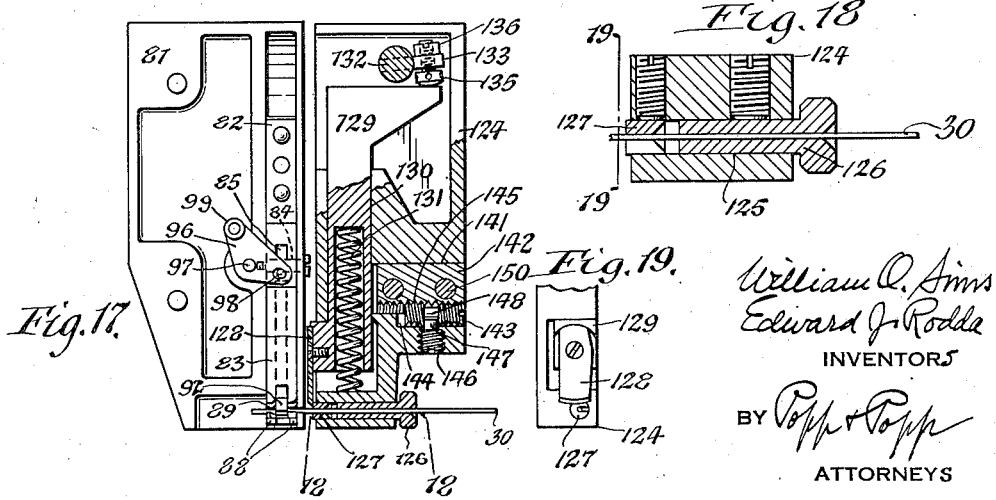
William O. Sims
Edward J. Rodda
INVENTORS
BY Popp & Popp
ATTORNEYS

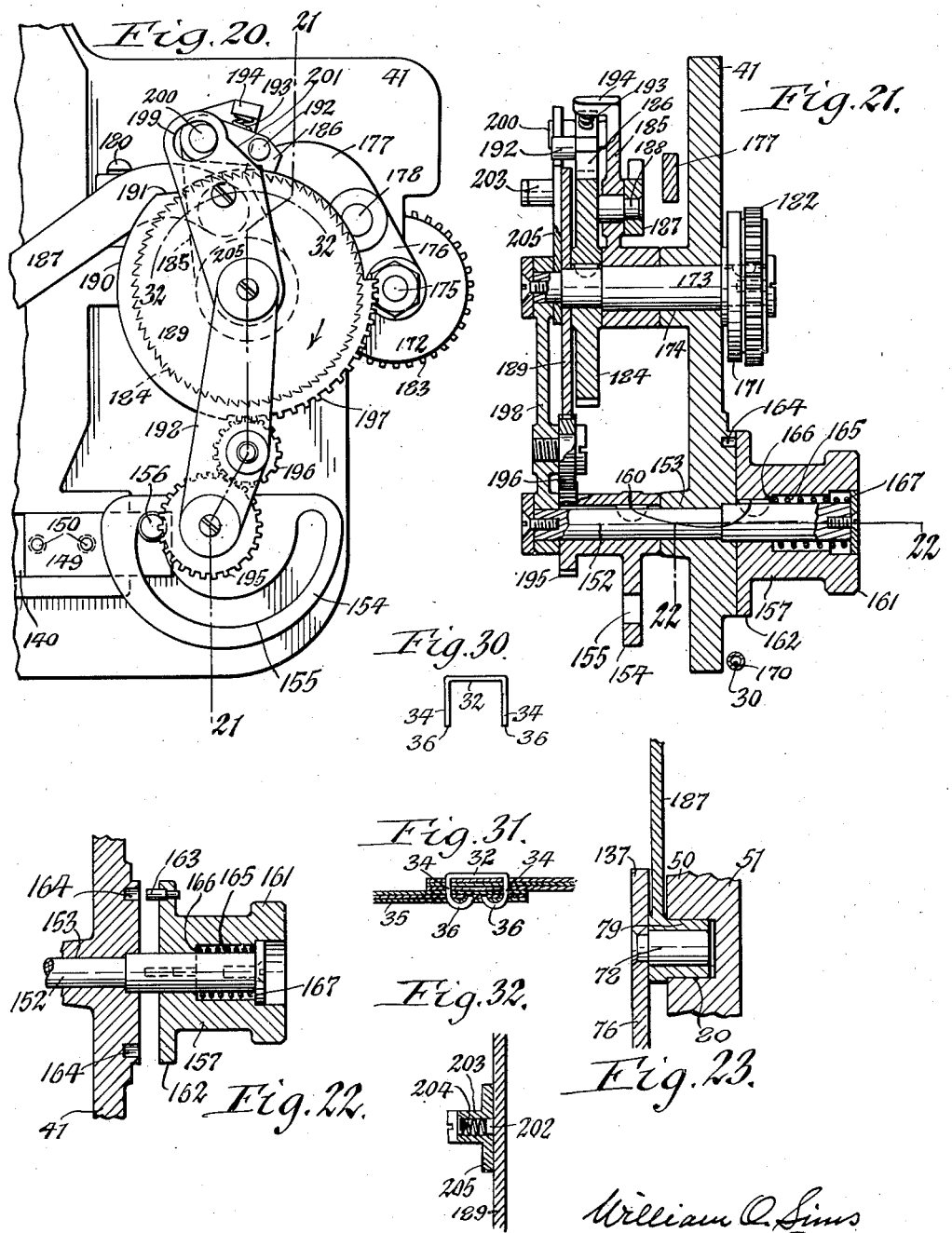

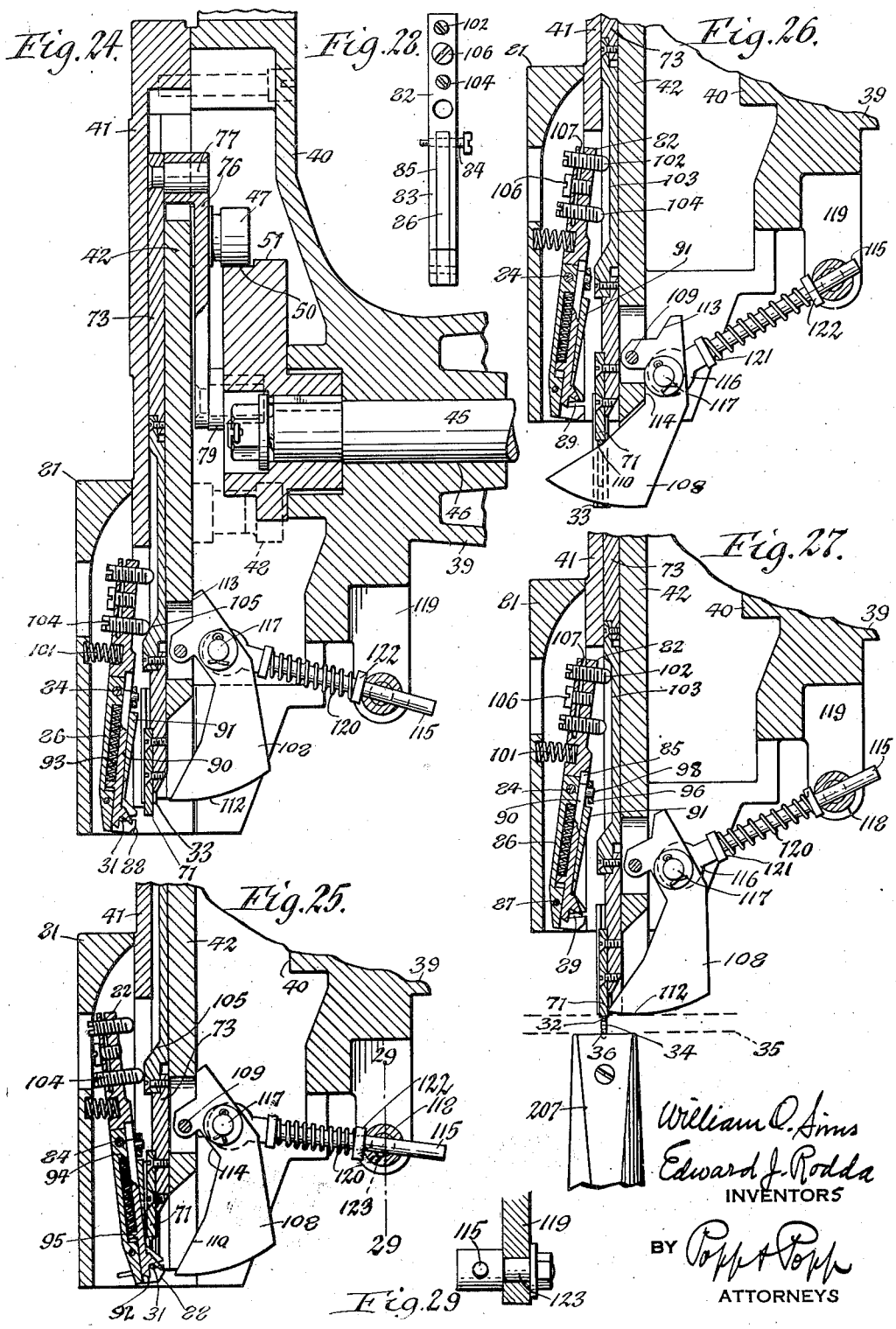

Patented Feb. 20, 1940

2,190,684

UNITED STATES PATENT OFFICE 2,190,684

WIRE STITCHING MACHINE

William O. Sims and Edward J. Rodda, Niagara Falls, N. Y., assignors to Niagara Falls Wire Stitchers, Inc., Niagara Falls, N. Y., a corporation of New York Application April 7, 1937, Serial No. 135,455

11 Claims. (Cl. 1—2)

This invention relates to a wire stitching or stapling machine whereby wire is supplied from a spool, cut into short lengths or blanks, then bent into U form, and then driven through the work, such as paper boxes, pamphlets, books or similar articles and clinched against the underside of the same for securing the several members thereof together.

The objects of this invention are to provide a machine of this character with improved means whereby the wire is fed and render the same more easily and readily adjustable for varying the length of the successive sections of wire which are fed from the supply spool; to improve the means for cutting the lengths or sections of wire from the continuous supply wire and permit of accurately adjusting this cutter mechanism so that the length of the two legs of the U-shaped staples formed therefrom will always be the same regardless of whether the staple as a whole is short or long; to improve the means for forming and driving the staple and the means for actuating the same so as to simplify their manufacture, reduce their cost of manufacture and also minimize the wear on the parts; to improve the anvil mechanism whereby the staple blanks are presented and supported during the operation of forming the blank into U-shape form and also carrying the same into position relative to the driving mechanism preparatory to being driven through the work to be stitched; to improve the means for mounting and actuating the staple support or shoe upon which the staple is carried during the operation of driving the same through the work; to improve the means for moving the clincher post into and out of its operative position relative to the staple forming and driving mechanism and permit the stitching machine to be operated either with the clincher post standing idly in a forwardly inclined position relative to the staple forming and driving mechanism, or in a vertical position relative to these parts depending upon the character of the work which is being done or to suit the choice of the operator; and to provide improved means for holding the clincher arm either in its horizontal operative position or in its pendant inoperative position.

In the accompanying drawings—

Fig. 1 is a front elevation of a wire stitching machine embodying our improvements.

Fig. 2 is a side elevation of the same.

Fig. 3 is a horizontal section, taken on line 3—3, Fig. 1.

Fig. 4 is a fragmentary vertical longitudinal section, on an enlarged scale, taken on line 4—4, Fig. 3 and showing the clincher post operating mechanism so organized that this post while in its normal or inoperative position will incline forwardly with reference to the staple forming and driving mechanism.

Fig. 5 is a horizontal section, taken on line 5—5, Fig. 4.

Fig. 6 is a detached side elevation of part of the mechanism for operating the clincher post, this view being taken along line 6—6, Fig. 5.

Fig. 7 is a view similar to Fig. 4 but showing the mechanism organized for holding the clincher post normally in its idle position vertically below the staple forming and driving mechanism.

Fig. 8 is a horizontal section, taken on line 8—8, Fig. 7.

Fig. 9 is a fragmentary vertical transverse section, on an enlarged scale, taken on line 9—9, Fig. 2 and showing more particularly the means for pivotally mounting the clincher post at its lower end on the main frame and also the means for adjusting the holder bar of the clincher block vertically relative to the clincher post.

Fig. 10 is a fragmentary vertical longitudinal section of the upright standard of the main frame and the clincher arm mounted thereon and shifted into its operative horizontal position.

Fig. 11 is a vertical transverse section, taken on line 11—11, Fig. 10.

Fig. 12 is a vertical section similar to Fig. 10 but showing the clincher arm in its pendant or inoperative position.

Fig. 13 is a fragmentary view, on an enlarged scale, of the head of the machine and showing the wire feeding mechanism in elevation and the staple forming and driving mechanism partly in section.

Fig. 14 is a horizontal section, taken on line 14—14, Fig. 13.

Fig. 15 is a fragmentary section, similar to the right-hand portion of Fig. 13 but showing the anvil mechanism, the staple former and the staple driver in a different position.

Fig. 16 is a vertical transverse section, taken on the correspondingly numbered line in Fig. 14 and looking forwardly.

Fig. 17 is a vertical cross section, taken on line 17—17, Fig. 14 looking forwardly.

Fig. 18 is a horizontal section, on an enlarged scale, taken on line 18—18, Fig. 17 and showing the tubular guide whereby the wire is guided preparatory to being severed into sections or blanks and also showing the relatively stationary tubular cutter.

Fig. 19 is a fragmentary face view of the wire cutting mechanism, this view being taken along line 19—19, Fig. 18.

Fig. 20 is a fragmentary rear elevation of the wire feeding and cutting mechanisms similar to that shown on the right of Fig. 16 but in a different position.

Fig. 21 is a vertical section, taken on line 21—21, Fig. 20.

Fig. 22 is a horizontal section, taken on line 22—22, Fig. 21.

Fig. 23 is a fragmentary cross section, taken on line 23—23, Fig. 16.

Fig. 24 is a vertical longitudinal section, taken on line 24—24, Fig. 16 and showing the former in its uppermost position, the driver nearly in its uppermost position, the anvil mechanism in its retracted or wire blank receiving position and the supporting shoe in its rearmost or inoperative position.

Fig. 25 is a view similar to Fig. 24 but showing the anvil mechanism in a position in which the wire blank is carried from the cutter mechanism to the staple forming mechanism and the latter has descended partly in the operation of bending the legs of the wire blank to convert the same into the form of a U-shaped staple.

Fig. 26 is a view similar to Figs. 24 and 25 but showing the anvil mechanism retracted, the staple forming mechanism in its lowermost position in which the forming of the wire into a staple has been completed and also showing the supporting shoe in its forward position in which it engages the wire staple for supporting the latter.

Fig. 27 is a view similar to Figs. 24, 25 and 26 but showing the anvil mechanism retracted, the driver in its lowermost position in which it has driven the staple through the work and its legs have been clinched or upset by the clincher block at the upper end of the clincher holder, and the staple supporting shoe moved rearwardly out of the path of the staple and the driver and away from the former.

Fig. 28 is a detached front elevation of the anvil lever and the parts mounted thereon.

Fig. 29 is a fragmentary vertical section, taken on line 29—29, Fig. 25.

Fig. 30 is an elevation of a staple formed in this machine before the same is driven through the work.

Fig. 31 is a fragmentary section showing a staple driven through the overlapping edges of parts of a box.

Fig. 32 is a fragmentary section, taken on line 32—32, Fig. 20.

Fig. 33 is a perspective view of a coupling for adjustably connecting a treadle with a shaft which is adapted to be rocked.

Fig. 34 is a section on line 34—34, Fig. 10.

In the following description similar characters of reference indicate like parts in the several views of the drawings.

Generally speaking this machine is adapted to take a continuous piece of wire 30 shown in Figs. 1 and 13 and present the same to mechanism whereby short sections or blanks 31, as shown in Fig. 15, are successively cut from the advancing end of this continuous piece, then bent into the form of a staple so as to provide an upper cross bar 32 and two legs 34 depending from opposite ends of the cross bar, as shown in Fig. 30 and then driven with its legs through the work 35, during which last mentioned operation the lower ends 36 of the legs are bent upwardly against the underside of the work, as shown in Fig. 31.

The main frame of this machine may be variously constructed to support the various working parts but in its preferred form, the same comprises a lower base 37 adapted to rest upon the floor of the building, an upright standard 38 rising from the rear part of this base, a horizontal arm 39 projecting forwardly from the upper end of this standard, and a hollow head 40 arranged on the front end of the arm 39 and provided on its front side with a removable face plate 41, as shown in its complete form in Figs. 1 and 2.

The operating mechanism of the machine is preferably driven from a longitudinal driving shaft 45 which is journaled horizontally in a bearing 46 in the frame arm 39 and projects at its front end into the hollow head 40 thereof while its rear end projects beyond the rear end of this arm. Motion may be taken from any suitable source for rotating this shaft, for example, an electric motor 52 may be mounted on the rear part of the frame and operatively connected with the driving shaft 45 by an intermediate transmitting mechanism which includes a clutch 53 for connecting and disconnecting this motor with the shaft. This clutch may be of any suitable construction and controlled from a foot operated mechanism which may be constructed as follows:

The numeral 54 represents a vertical movable clutch shifting rod which is guided in the rear part of the main frame and yieldingly held in its elevated position by means of a spring 55 for causing the clutch to be uncoupled and disconnect the motor 52 from the shaft 45. An L-shaped treadle or foot lever is provided adjacent to the base which has a transverse front arm 56 arranged transversely in front of the base and a longitudinal arm 57 arranged along the left hand side of the same. On the adjacent part of the base a horizontal shaft 58 is journaled transversely in a bearing 59 on the base and its outer end is connected with the longitudinal arm 57 of the clutch treadle while its inner end is provided with an upwardly projecting rock arm 60 which is arranged within the hollow base 37. The longitudinal arm 57 of this treadle is preferably connected with the rock shaft 58 by means which permit the same to be adjusted both circumferentially relative to this shaft, and also lengthwise of the machine. The preferred means for this purpose consist of a coupling block 61 provided with a longitudinal opening 62 which receives the longitudinal arm 57 of the clutch operating treadle and a transverse opening 63 which receives the transverse rock shaft 58. This block is provided with a split 64 extending upwardly from the opening 62 to the upper side of the block and also with a split 65 extending from the opening 63 to the front side of the block, as best shown in Fig. 33. After this block has been turned circumferentially on a shaft 58 and the longitudinal arm 57 of the clutch treadle has been moved lengthwise into the desired position, then these parts are rigidly clamped together by tightening screws 66 which connect the parts of the block on opposite sides of its split 64 and also tightening a screw 67 which connects the parts of said block on opposite sides of its split 65, thereby clamping the respective parts of the block on the longitudinal arm 57 and the shaft 58.

Motion is transmitted from the rock arm 60 of the transverse shaft 58 to the lower end of the clutch rod 54 by means of an elbow lever 68 arranged within the lower part of the standard 38 and having its lower arm connected by means of a link 69 with the rock arm 60 while its upper arm is connected by means of a link 70 with the lower end of the clutch shifting rod 54. When the machine is idle the clutch treadle is held in its elevated position by means of the spring 55 and when this treadle is depressed by the foot of the operator motion is transmitted to the clutch 53 which permits the latter to couple the motor 52 with the driving shaft 45 and thereby cause the machine to operate.

On the face plate 41 of the head 40 is mounted the mechanism whereby the continuous piece of wire is cut into short lengths or blanks and the latter are converted into the shape of staples and driven through the work, which mechanism embodies the present improvement and is constructed as follows:

Referring more particularly to Figs. 13–16, and 24–27, the numeral 42 represents a vertically reciprocating former slide or bar which is guided in suitable ways 43 on the inner side of the face plate 41 and provided at its lower end with two former jaws 33 which are arranged transversely in line but spaced apart and provided on their opposing edges with vertical guideways 44, as best shown in Figs. 13, 14 and 15. This former slide or bar and its two former jaws 33 comprise the essential parts of the former of the machine, and derive motion from the horizontal driving shaft 45 by means best shown in Figs. 16 and 24 and constructed as follows:

The numerals 47 and 48 represent the upper and lower abutments mounted on the rear side of the former slide 42 above and below the axis of the driving shaft 45 and each having preferably the form of a roller which is pivoted on the respective part of the former slide 42 by means of a pivot screw or pin 49, as shown in Fig. 16. These abutment rollers are engaged by the front and rear sections 50 and 51, respectively, of an operating cam which is secured to the front end of the driving shaft 45 so that during the rotation of the latter the front cam section 50, by engagement with the abutment 47, operates to lift the staple former, and the rear cam section 51, by engagement with the lower abutment 48, operates to lower this former. By thus constructing this former actuating cam in two sections the same can be finished more easily and accurately to perform their respective functions for imparting the desired timed movement to the staple former.

In the preferred construction the upper or lifting abutment 47 is mounted on the former slide in advance of a vertical line drawn through the axis of the driving shaft and the operating cam sections 50, 51 and the lower abutment 48 is also arranged in advance of this vertical line, relative to the direction of rotation of the actuating cam, whereby these abutments are arranged on diagonally opposite sides of this vertical line and parallel to the line of reciprocation of the staple former, as shown in Fig. 16. As a result of this arrangement with abutments, the lifting cam section 50 engages with the upper abutment 47 in the manner of a wedge and the lowering cam section 51 also engages with the lower abutment 48 in the manner of a wedge so that the operation of raising and lowering the staple former is effected more easily and with less power and it also avoids undue lateral pressure or thrust of the staple former slide against its guideways 33, thereby reducing the wear on these parts and necessitating less frequent repair for the purpose of maintaining the machine in a high state of efficiency.

Moreover, by providing individual cam sections for the upper and lower abutment rollers 47, 48 each of these abutment rollers can be so placed with reference to its respective cam section as will produce the most effective thrust of the lifting cam against the lifting roller and the most effective thrust of the lowering cam against the lowering roller with a minimum expenditure of power and wear on its parts.

In the preferred construction of the sections of this operating cam the same are formed integrally, as shown in Fig. 24, inasmuch as this maintains the same in a definite relation and also permits the same to be manufactured more economically.

After the straight wire blank has been bent by the jaws of the former into a staple, the latter is driven downwardly so that its legs penetrate the work 36 by engagement of a driver head or hammer 71 with the upper side of the staple cross bar. This driver head is arranged between the two former jaws 33 and is guided at its opposite vertical edges in the guideways 44 on the opposing inner sides of these jaws. This driver head is detachably connected with the lower end of a vertically movable driver bar 73 which slides in a vertical guide 74 in the front side of the former slide 42, as shown in Figs. 13–15 and 24–27. A vertical reciprocating movement is imparted to the driver by a link 76 pivotally connected at its upper end by a pin 77 with the upper end of the driver bar 73 while its lower end is pivotally connected by a crank which is rotated by the driving shaft 45 and which preferably consists of a pin 78 secured to the lower end of the link 76 and engaging with a cylindrical bushing 79 which is seated in a circular opening 80 formed on the front side of the body of the cam sections 50, 51 on one side of the axis thereof, as best shown in Figs. 16, 23 and 24.

The straight wire blank is cut from the continuous length of wire in front of the forming and driving mechanism, and is carried rearwardly to the forming and driving mechanism by an anvil mechanism which is best shown in Figs. 13–17 and 20–27 and constructed as follows:

The numeral 81 is an anvil case which is detachably secured to the lower front part of the face plate 41 and has its hollow inner side opening downwardly and also rearwardly toward such face plate. Within this anvil case is arranged an upright anvil lever which has upper and lower arms 82, 83 and is pivoted between said arms on said anvil case by a horizontal transverse pin 84. The lower arm of this anvil lever is provided with a vertical slot 85 in which an upright spring block 86 is secured by passing the pivot pin 84 through the upper end of this spring block and passing a lower retaining pin 87 through the lower part of this block and the lower anvil arm on opposite sides of this slot, as best shown in Figs. 24–28. The lower anvil arm is provided on its inner side and on opposite sides of its slot 85 with two rearwardly projecting jaws 88, each of which has a rearwardly opening slot 89. The two jaws 88 of this anvil lever form the anvil or mandrel by which the staple blank is supported during the operation of bending its opposite ends downwardly and converting the same into an inverted U-shaped staple.

After the front end of the continuous wire has been fed transversely through the anvil the foremost part of this wire is pressed downwardly against the lower part of the anvil by a gripper mechanism so as to hold the wire in place thereon during the time that a piece of the same is cut off to form a staple blank and also during the time that the lower arm of the anvil lever is moved rearwardly into position for presenting this staple blank underneath the jaws of the staple former and the hammer of the staple driver. This clamping mechanism comprises a vertically movable clamping bar 90 which is guided in a way between the spring block 86 and an inner wall 91 on the lower anvil arm 83 and the clamping bar is provided at its lower end with a fork-shaped gripping jaw 92 which is adapted to engage with the central part of the upper side of the staple blank. This staple clamping bar and its jaw are moved downwardly into a depressed position for gripping the staple blank by means of a spring 93 arranged in a pocket formed between the inner side of the spring block 86 and the opposing outer side of the clamping bar and bearing at its upper end against a shoulder 94 formed by the upper end of said spring pocket while its lower end bears against a shoulder formed by a forwardly projecting lug 95 on the lower part of the clamping bar. Lifting of the clamping bar for the purpose of releasing the staple blank is effected by means of a lifting lever 96 which swings in a vertical transverse plane between the anvil casing and the face plate 41 of the frame head which contains the staple forming and driving mechanism. This lifting lever is pivoted by means of a horizontal longitudinal pin 97 on the inner side of the anvil case as shown in Fig. 17 and its lower arm is provided with a slot which receives a rearwardly projecting pin 98 on the upper end of the clamping bar 90 and the upper arm of this lever is provided with a rearwardly projecting pin or roller 99 which is arranged in the path of a cam 100 on the adjacent part of the former slide, as shown in Fig. 13.

The turning movement of the anvil lever in the direction for carrying its anvil or mandrel from the former and driver mechanism forwardly or outwardly to the wire receiving position is effected by means of a spring 101 interposed between the upper arm of this anvil lever and the adjacent front wall of the anvil case, as shown in Figs. 24-27. For the purpose of accurately arresting this forward movement of the anvil in the correct position for receiving the wire from the feeding mechanism adjustable stop means are provided which preferably consist of an adjusting screw 102 arranged in a threaded opening in the uppermost part of the upper anvil lever arm and adapted to engage with an upright stop surface 103 on the adjacent front part of the staple driver slide, as shown in Figs. 26 and 27. The forward movement of the anvil is accurately arrested in a position for bringing the staple blank into exact alignment with the jaws of the former and the hammer of the driver and it is preferable to employ for this purpose an adjustable stop screw 104 which engages with a threaded opening in the upper arm of the anvil lever between its axis and the upper adjustable stop screw 102 and providing the adjacent part of the staple driver slide with a cam 105 which is adapted, during the last part of its upward movement, to engage with the rear or inner end of the stop screw 104 and shift the anvil lever from the staple blank receiving position, shown in Fig. 24, to the staple blank delivery position, shown in Fig. 25.

After these two stop screws have been adjusted so as to accurately determine the foremost and rearmost positions of the anvil with reference to the wire feeding and cutting mechanisms and the staple forming and driving mechanisms, these stop screws are held in place by means which preferably consist of a clamping screw 106 which connects the parts of the upper anvil lever arm located on opposite sides of a split 107 which is formed lengthwise therein and crosses the openings of both screws 101 and 103, so that upon tightening this screw the parts of this lever on opposite sides of the split will be clamped against both these stop screws and thereby prevent the same from turning out of place while the machine is in operation.

After the anvil has moved inwardly into its rearmost position and carried the straight staple blank into a horizontal transverse position below the former jaws and driver hammer, the anvil retains the blank in this position a sufficient length of time to permit the former jaws during their subsequent downward movement to engage the opposite ends of the staple blank and bend the same downwardly into the form of depending legs 34 along the outer sides of the anvil. After the staple former has effected the initial part of its downward movement and effected the bending of the straight wire blank into U-form the cam 100 engages the roller 99 and turns the lifting lever 96 so as to release the staple and permit the anvil to move forwardly away from the forming and driving mechanism. After the anvil is withdrawn forwardly out of engagement from the staple, means which support the staple on its inner side during the subsequent operation of driving the same through the work come into operation. These staple supporting means which embody a feature of the present improvement are preferably constructed as follows:

The numeral 108 represents a staple support or shoe which is movable forwardly and backwardly into and out of a position in which it engages the underside of the cross bar and the inner sides of the legs of the staple. This shoe is pivoted at its upper end on the adjacent lower part of the driver bar by means of a horizontal transverse pin 109 and is provided below its axis with a forwardly inclined bearing face 110 which is adapted to engage with the underside of the staple cross bar and on its opposite vertical sides with upright faces 111, 111 which are adapted to engage with the inner sides of the staple legs while the lower end of this shoe is provided with a curved face 112 which is concentric with its axis and adapted to engage with the upper side of the work which is being stitched. The rearward movement of the staple support or shoe is limited by means of a stop 113 formed on the upper rear part thereof above its axis and adapted to engage with the rear side of the former slide, as shown in Figs. 24 and 25, and the forward movement of this shoe is limited by means of a front stop face 114 provided on this shoe below its axis and adapted to engage with the adjacent part of the rear side of the former slide, as shown in Fig. 26. Means are provided for automatically moving the staple support or shoe into its forward position for engaging the inner sides of the cross bar and legs of the staple during the downward movement of the staple former and also retracting this shoe rearwardly relatively to the former jaws and the staple driving hammer during the upward movement of the former, which means as shown in the drawings are constructed as follows:

The numeral 115 represents a shifting rod which is provided at its front end with a pivot head 116 pivotally connected by means of a transverse horizontal pin 117 with the upper part of the staple support or shoe in rear of the axis of the latter while the rear part of this shifting or tension rod is slidable in an opening formed in a swivel stud or block 118 which is pivoted by a pin 123 on an adjacent stationary part 119 of the frame arm so that the swivel block can turn about a horizontal transverse axis. The shifting rod is yieldingly urged forwardly by spring means which preferably consist of a helical spring 120 surrounding the shifting rod and bearing at its front end against a shoulder 121 formed on the pivoted head 116 while its rear end bears against a shoulder which is formed by a washer 122 mounted on the shifting rod and bearing against the front side of the swivel block so that the latter forms a stationary abutment for the rear end of this spring.

In the position of the parts shown in Fig. 24 the former is in its uppermost position, the driver has nearly completed its upward stroke, the anvil is in its foremost position in which it receives the wire from the wire feeding and cutting mechanism and the staple support or shoe is in its rearmost position in which it is retracted from the staple forming and driving mechanism. At this time the upper stop 113 of the staple support or shoe engages the back of the driver slide and the pivotal connection 117 between the shifting rod and the shoe is arranged above a line extending from the axis of the shoe to the axis of the abutment block 118, whereby the pressure of the spring 120 holds the shoe yieldingly in this position. As the driver completes its upward stroke its cam 105 moves the anvil lever so that the anvil thereof carries the wire staple blank underneath the driver and then the former effects the initial part of its descent and bends the ends of the wire blank downwardly into the form of legs on opposite sides of the anvil, but the staple support or shoe still remains in its retracted position relative to the former, driver and anvil, as shown in Fig. 25. During the next part of the descent of the former, the anvil withdraws from underneath the driver hammer, the driver effects the initial part of its descent and engages the cross bar of the staple, and the staple support or shoe is moved forwardly into engagement with the underside of the staple cross bar and between the staple legs, as shown in Fig. 26. This movement of the shoe takes place the instant that the pivotal connection 117 between the shifting rod and the shoe has been carried below the dead center line running from the pivot 109 of the shoe to the pivot 123 of the abutment block at which time the spring 120 is free to expand and shift the shoe from the rearward position shown in Figs. 24 and 25 to the forward position shown in Fig. 26. The former and shoe continue their downward movement until the former jaws bear against the top of the work 35 which is being stitched and during this time the driver also moves downwardly relative to the former and shoe so that the staple is pushed off from the former jaws and from the shoe and forced downwardly through the work, as shown in Fig. 27. The former, driver and shoe now rise while substantially in the relative position shown in Fig. 27 until the joint 117 between the shoe and the shifting rod passes above a line passing through the axes of the pivots 109 and 123 of the former and the abutment block and then the spring 120 throws the shoe from the forward position shown in Fig. 27 to the rearward position shown in Fig. 24 with a toggle-like action. Upon moving the shoe in either direction and carrying the pivotal connection between the same and the shifting rod in line with the axes of the shoe and the abutment block the compression of the spring 120 is increased but when this pivotal connection passes to the other side of this dead center line the expansion of this spring quickly completes the movement of the shoe in the respective direction.

By this means the shoe is completely withdrawn from engagement with the driver and only reengaged therewith when required for guiding the staple while the latter is being driven into the work, thereby saving the driver and shoe from unnecessary wear which otherwise would occur if the shoe were constantly in engagement with the driver or parts adjacent thereto.

The means whereby short lengths or blanks are successively cut off from the advancing or front end of the continuous piece of stock wire for subsequent formation into staples are best shown in Figs. 13, 14, 16–23 and constructed as follows:

Arranged on the left side of the anvil mechanism is a main cutter block or carrier 124, the lower part of which is provided with a horizontal transverse opening 125 in the outer end of which is secured a tubular guide or sleeve 126 whereby the wire stock 30 is directed toward the anvil. In the inner end of this opening is mounted a relatively stationary tubular cutter 127 through which the wire stock passes on its way to the anvil mechanism and past a movable cutter blade 128 adapted to move vertically past the inner end of the tubular cutter for severing a length of wire projecting inwardly beyond the cutter tube and cutter blade. This movable cutter is detachably secured to the inner side of a cutter slide 129 which is guided in a way 130 on the adjacent part of the main cutter block, as shown in Figs. 14 and 17. This cutter slide together with the movable cutter blade mounted thereon is yieldingly held in an elevated position by a spring 131 interposed between the lower part of the main cutter block and the underside of the cutter slide. Depression of the cutter slide is effected by means which comprise a horizontal longitudinal rock shaft 132 journaled in the central part of the face plate 41 and provided at its front end with a horizontal rock arm 133 which is arranged within the upper part of the main cutter block and provided at its rear end with an upright rock arm 134 which is arranged in rear of the face plate 41 of the main frame. On the horizontal rock arm 133 is mounted a screw 135 having a head at its lower end which bears against the upper side of the cutter slide 129. By turning this screw in one direction or the other the relative position of the horizontal rock arm 133 may be adjusted relative to the cutter slide for causing the movable cutter blade to cooperate with the tubular cutter and severing the wire at the proper time and after such adjustment of this screw the same is held against turning by means of a clamping nut 136 mounted thereon and engaging with the upper side of the cutter arm 133, as shown in Fig. 17. A rotary motion is imparted to the cutter shaft for causing its horizontal arm to depress the cutter slide by means of a cam 137 which forms an extension of the lower end of the link 76 and engages with a pin or roller 138 on the upper end of the rear cutter arm 134, as shown in Fig. 16. The timing of this wire cutting mechanism is so determined that the movable cutter blade is in its elevated position and clear of the path of the wire stock while the latter is being fed forwardly through the tubular cutter to the anvil mechanism and after the wire stock comes to rest the movable cutter blade descends and moves past the outer end of the tubular cutter and severs the wire stock to form a wire blank 31. After such cutting operation the upper cutter blade is immediately raised in order to clear the path of the wire stock and permit the same to again move forwardly to the anvil.

Means are provided for effecting a coarse adjustment of the cutter mechanism and also effecting a fine adjustment of the same independently of the coarse adjustment and thus enable the cutter mechanism to be actuated simultaneously with the adjustment of the wire-feed mechanism and still cut blanks of different lengths and present the same in the proper position to the staple forming and driving mechanism for producing staples having legs of equal length. The preferred means for effecting the coarse and fine adjustments of the cutter mechanism are preferably constructed as follows:

The numeral 139 represents a guide lug projecting rearwardly from the main cutter block and into engagement with a horizontal guide slot or way 140 formed in the adjacent part of the face plate 41 and extending from the front side to the rear side of the same. In its outer part the main cutter block or carrier is provided with a horizontal guideway 141 which is engaged by an auxiliary cutter block or carrier 142, as best shown in Fig. 17. Means are provided for sliding the main cutter block or carrier and the auxiliary cutter block or carrier horizontally relatively to one another for effecting a fine adjustment of the wire cutters. The preferred form of means for adjusting the main and auxiliary cutter blocks or carriers relatively to each other, as shown in Fig. 17, comprise a rotary adjusting screw 143 arranged horizontally between the underside of the auxiliary cutter block and the adjacent lower part of the main cutter block and having its lower part turning in a semi-circular groove 144 formed in the main cutter block while the upper half of this adjusting screw engages with a semi-helical screw thread 145 formed on the underside of the auxiliary cutter block. The adjusting screw 143 is capable of rotation relative to the main and auxiliary cutter blocks but is incapable of longitudinal movement on the main cutter block, this being accomplished by means of a retaining screw 146 arranged in the lower part of the main cutter block and having a retaining pin 147 at its upper end which engages with an annular groove 148 formed in this adjusting screw about midway of its length. Due to this construction rotation of the adjusting screw 143 in either direction will cause the main cutter block to be moved horizontally toward and from the anvil mechanism and thereby carry the cutters of the wire severing mechanism toward or from the anvil mechanism. During this action the main cutter block or carrier slides with its guide lug 139 in the guide slot 140 of the face plate 41 and is held thereby against vertical displacement on the face plate 41.

On the rear side of the face plate 41 is arranged a horizontally and transversely movable adjusting plate or slide 149 which is connected with the auxiliary cutter block or carrier by means of two coupling pins or rods 150 which are connected at their front and rear ends respectively with the auxiliary cutter block 142 and the adjusting slide 149 and pass with their intermediate parts through enlarged openings 151 in the adjacent part of the main cutter block or carrier which is arranged between the auxiliary cutter block and this adjusting slide, as best shown in Figs. 13, 14 and 17.

The shifting of the adjusting slide is effected by the operator from the front of the machine by means which are preferably constructed as follows:

The numeral 152 represents a horizontal adjusting shaft which is journaled lengthwise in a bearing 153 in the lower left hand part of the face plate 41 and has secured to its rear end a cam plate 154 having a cam slot 155 which receives a pin or roller 156 projecting rearwardly from the adjusting slide 149, as shown in Figs. 14, 16, 20 and 21. Upon turning the shaft 152 in one direction or the other the cam slot 155 causes the adjusting slide 149, and the main and auxiliary cutter blocks 124, 142 to move horizontally and trannsversely in unison and thereby effect a coarse adjustment of the wire cutter mechanism relative to the anvil mechanism and the forming and driving mechanism. If it is found that the wire cutter mechanism is not in the correct position for producing staples having legs of equal length then an additional fine adjustment of the main cutter block may be effected relative to the auxiliary cutter block by turning the adjusting screw 143 in one direction or the other.

Means for rotating the adjusting shaft 152 are so organized that they also serve as an index for locating the cutter mechanism to suit the length of staples desired and also to lock the cutter mechanism against further movement after this adjustment has been effected. For this purpose an adjusting sleeve 157 is mounted on the front end of the adjusting shaft 152 by means of a spline or key 160 so as to permit this adjusting sleeve to move lengthwise relative to the adjusting shaft but compel the same to turn together. The front end of this adjusting sleeve is provided with a knob or handle 161 whereby the same may be turned manually and its rear end is provided with a disk 162 which carries a rearwardly projecting locating and locking pin 163 adapted to engage with one or another of a segmental row of equidistant locking or locating openings 164 formed on the front side of the face plate 41 concentric with the axis of the adjusting shaft, as shown in Figs. 13 and 21. Upon moving the adjusting sleeve 157 forwardly the locking pin 163 is disengaged from the respective locating opening 164, as shown in Fig. 22, and while the adjusting sleeve is in this position the adjusting shaft 152 may be turned in one direction or the other for bringing the cutter mechanism into the desired position relative to the anvil mechanism, and then the adjusting sleeve is again moved rearwardly for engaging the locking pin with the respective locating opening. The adjusting sleeve is yieldingly held in its rearmost position so as to maintain the locking pin in engagement with the respective locating opening and for this purpose spring means are provided which preferably consist of a helical spring 165 surrounding the front end of the adjusting shaft and bearing at its rear end against a shoulder 166 formed in the bore of the adjusting sleeve while the front end of this spring bears against an abutment or shoulder 167 formed by a disk secured to the front end of the adjusting shaft, as shown in Figs. 13, 21 and 22. The front side of the face plate 41 is preferably provided with marks 169 indicating in fractions or otherwise the thickness or approximate thickness of the stock or work to be stitched corresponding to the position of the cutter mechanism when the locking pin 163 of the adjusting sleeve engages with the respective locating opening. By spacing the locating openings in the segmental row equal distances from one another, as shown in Fig. 13, the operator is able to more readily select the particular locating opening for cutting wire blanks and producing staples having legs of a given length, thereby facilitating the adjustment of the cutter mechanism for effecting wire stitching with staples of a given length and enabling more perfect and uniform work to be produced.

The stock or supply of continuous wire is unwound from a spool 168 which is rotatably mounted on the upper part of the head of the frame and passes thence downwardly over an upper curved guide arm 169I thence downwardly through a feed mechanism which is arranged on the adjacent part of the face plate, thence through a curved guide tube 170 mounted on the lower part of this face plate and thence to the horizontal guide tube 126 which is mounted on the main cutter block or carrier 124. The wire feed mechanism is best shown in Figs. 13, 14, 16, 20, 21 and 23 and constructed as follows:

The numerals 171, 172 represent two wire feed rollers which are arranged side by side and adapted to grip the stock wire between the opposing portions of their peripheral faces so that upon rotating these rollers in the direction of the arrows associated therewith in Fig. 13, the stock wire will be fed downwardly from the supply spool to the staple cutting, forming and driving mechanism. The inner roller 171 of this pair of feed rollers is mounted on the front end of a feed shaft 173 which is journaled in a fixed bearing 174 on the adjacent part of the face plate 41 and the other wire feed roller 172 is mounted on an arbor 175 which is journaled in the outer arm of a shifting lever which is pivoted between its outer arm and inner arms 176, 177 to the rear side of the face plate by means of a horizontal pin 178, as best shown in Fig. 20. The outer wire feed roller 172 is bodily movable toward and from the relatively fixed inner feed roller 171 for the purpose of gripping the wire between these rollers and also separating these rollers in order to permit of conveniently removing the wire therefrom or replacing the same therebetween. In order to enable the outer feed roller to adapt itself to wires of different thicknesses yielding spring means are provided for moving the outer roller toward the inner roller which means preferably consist of a spring 179 seated at its lower end on the face plate 41 and bearing at its upper end against the underside of the inner roller arm 177, as shown in Fig. 16. For the purpose of enabling the operator to conveniently separate the wire feed rollers and also again bring the same together shifting means are provided which are operable from the front side of the machine and which preferably consist of a rock shaft 178 journaled lengthwise and horizontally in a suitable bearing in the upper part of the face plate 41 and provided at its rear end with a cam 180 adapted to engage the upper side of the inner roller shifting arm 177 while the front end of this shaft is provided with a handle 181 whereby this shaft may be manipulated. Upon turning the shaft so that the low face of the cam 180 is opposite the adjacent part of the inner roller shifting arm 177, as shown in Figs. 16 and 20, the spring 179 is permitted to move this lever in the direction for engaging the bodily movable outer wire feed roller 172 toward the inner roller 171 which has a fixed axis. When, however, the shaft 178 is turned so as to engage the salient part of the cam 180 with the inner arm 177 of the feed roller shifter then the outer feed roller 172 is moved away from the inner feed roller 171, and forms a relatively wide gap between these rollers which permits of readily inserting the wire to be fed between the same and also releasing this wire whenever this becomes necessary.

The two feed rollers are compelled to turn in unison by means of a pair of intermeshing gear wheels 182, 183 secured to the front ends of the roller shaft and the roller arbor, as shown in Fig. 14. An intermittent forward rotary movement is imparted to these feed rollers so that the wire stock is fed forwardly step by step at such a distance during each step as will produce staple blanks of the required length by the cutter mechanism. The preferred means for effecting this intermittent forward movement of the wire feed rollers are constructed as follows:

Referring to Figs. 14, 16, 20 and 21, the numeral 184 represents a ratchet wheel arranged in rear of the face plate 41 and secured to the rear part of the roller shaft 173. On this roller shaft between the face plate 41 and the ratchet wheel 184 is pivotally mounted a ratchet arm 185 upon the outer end of which is pivoted a feed pawl 186 which is adapted to engage with the teeth of the ratchet wheel for moving the latter forwardly and turning the wire feed rollers in the direction for advancing the stock wire. A rocking motion is imparted to this ratchet arm from the rotary driving shaft 45 through the medium of a ratchet link 187 which is pivotally connected at its outer end by means of a pin 188 with the ratchet arm 185, as shown in Fig. 21, while the inner end of this link is pivotally connected with the bushing 79 around the crank pin 78 of the driver operating link 76 and the cams 50, 51 by connecting this ratchet link with the pivot sleeve 79 which is interposed between the crank pin 78 and the pivot opening 80 in said cams, as shown in Fig. 23.

The arc of reciprocation of the ratchet arm is always the same but means are provided for controlling the duration of engagement of the feed pawl with the ratchet wheel in order to enable the extent of rotation of the feed rollers during each feeding operation to be regulated in accordance with the desired length of staple blank which may be required for a particular work. For this purpose a hold-out shield 189 is provided which is mounted on the roller shaft 173 in rear of the ratchet wheel 184 so as to turn concentrically therewith and provided on its periphery with a high concentric rear hold-out face 190 and an inclined lifting or cam face 191 at the front end of this concentric face. During the rearward part of the backward stroke of the feed pawl a throwcut pin 192 on the same engages the incline 191 and is raised by the same until it engages the concentric face 190 whereby the pawl is disengaged from the teeth of the ratchet wheel. While the pawl is effecting a forward stroke the same is held out of engagement from the teeth of the ratchet wheel during the first part of this stroke by the concentric face 190 of the shield but during the latter part of this stroke the pin 192 of this pawl runs down the incline 191 of the shield and permits this pawl to engage the ratchet teeth, as shown in Fig. 20, up to the end of the forward stroke of the pawl, thereby turning the ratchet wheel forwardly one step and operating the rollers 171, 172 for advancing the stock wire accordingly.

By adjusting the hold-out shield circumferentially the pawl can be held out of engagement a longer or shorter time from the ratchet wheel while in its rearward position and also engage with the ratchet wheel during a greater or shorter extent of the forward part of its throw and thereby vary the length of wire which is fed during each step to suit the length of staple required. The pawl, when free from the shield during its forward movement, is moved inwardly into engagement with the teeth of the ratchet wheel by a spring 193 interposed between this pawl and a shoulder 194 on the ratchet arm so that this pawl and the ratchet wheel will move together up to the end of the forward stroke of the ratchet arm and thereby operate the feeding rollers for advancing the wire.

The adjustment of the hold-out shield is preferably effected simultaneously with adjustment of the cutter mechanism relative to the anvil, former and driving mechanism so that the feeding effect of the rollers will be reduced whenever the cutter mechanism is adjusted to produce a shorter staple blank, and the feeding effect of these rollers is increased whenever the cutter mechanism is adjusted to produce a staple blank of greater length. The preferred means for thus adjusting the hold-out shield are best shown in Figs. 16, 20 and 21 and comprise a driving gear wheel 195 mounted on the rear end of the adjusting shaft 152 and an intermediate gear pinion 196 having its opposite sides meshing with the driving gear wheel 195 and a gear segment 197 formed on the lower side of the hold-out shield.

This intermediate pinion may be supported in any suitable manner but, as shown in Figs. 16, 20 and 21, this pinion is mounted on a cross bar 198 which is hung at its upper and lower ends on the roller shaft 173 and the adjusting shaft 152. Upon turning the adjusting shaft 152 by means of the knob 161 the hold-out shield is turned so as to cause the pawl to engage with the ratchet wheel during such part of its forward stroke as will produce the feeding effect of the wire necessary to produce a staple of a certain length and at the same time the cam 155 will be turned so as to shift the wire cutting mechanism into position which will sever this wire at such a point relative to the anvil, former and driver that the staple blank will be centered and produce legs of equal length thereon. In Fig. 16 this cutter adjusting cam and the hold-out shield are shown in a position which will produce the shortest length of staple, and in Fig. 20 this cam and hold-out shield are shown in the position which will produce staples of the greatest length.

If desired means may be provided which will permit the feed pawl to only engage with the ratchet wheel during its forward movement but hold this feed pawl out of engagement during its entire backward movement in order to avoid the clicking noise which otherwise would be produced by the tripping of the pawl backwardly over the teeth of the ratchet wheel. The means for thus eliminating the click of the feed pawl during its backward movement comprises a throw-out arm 205 pivotally mounted on the rear part of the wire feed roller shaft 173 and provided with a friction device adapted to engage the adjacent surface of the hold-out shield, also with a circumferentially extending slot 199 which receives the rear end of the pivot pin 200 which connects the pawl with the upper end of the pawl or ratchet arm and also with an incline or cam surface 201 which is adapted to be engaged by the throw-out pin 192 on the front end of the feed pawl. This friction device may consist of a friction block 202 arranged in a pocket 203 on the throw-out arm and pressed against the side of the hold-out shield by a spring 204 arranged in said pocket, as shown in Fig. 32. During the forward movement of the pawl with its ratchet arm the pivot pin 200 engages with the front end of the slot 199 in the throw-out arm, as shown in Fig. 20, and the friction device of the latter slides on the adjacent relatively stationary surface of the hold-out shield. During the latter part of this movement of the feed pawl the same engages with the ratchet wheel for producing the forward feed of wire. During the first part of the subsequent backward stroke of the ratchet arm and pawl the throw-out arm 205 is temporarily held stationary by engagement of its friction device with the relatively stationary hold-out shield which permits the throw-out pin 192 of the pawl to ride up on the incline 201 of the throw-out arm and cause this pawl to be disengaged from the ratchet wheel, as shown in Fig. 16. As the ratchet arm and pawl continue their backward movement to the end of their rearward stroke the pivot pin 200 of the pawl engages with the rear end of the slot 199 and carries the throw-out arm backwardly to its rearmost position during which time the friction device of the throw-out arm slips on the relatively stationary hold-out shield.

This action of the means for throwing the pawl out of engagement from the teeth of the ratchet wheel during the backward stroke of the pawl is independent of the action of the hold-out shield and the means for varying the extent of the feeding action of the wire feed rolls, notwithstanding that at times the pawl at the end of its stroke may be held out of engagement from the teeth of the ratchet wheel by the throw-out arm and also by the hold-out shield.

It will be noted in this connection that the means for determining the position of the cutter mechanism and the means for adjusting the feeding action of the wire feed rollers and locking the same in one or another of the different selective positions which includes the circumferentially adjustable locking pin 163 on the sleeve 157 and the segmental row of equally spaced locating or locking recesses or openings 164 on the face plate 41 enable the operator to easily adjust both the cutting and feeding mechanism to suit the length of staple blank required.

While the staple is driven downwardly through the work which is being stitched the latter is supported on its underside by a clincher block 206 whereby the ends 36 of the staple legs are bent against the underside of the work to be stitched.

The means for supporting the clincher block are so organized that the same may be raised or lowered to permit of stitching or stapling boxes, pamphlets or books of different thicknesses, one form of these means, as shown in Figs. 1-9, being constructed as follows:

The numeral 207 represents a clincher block holder having the form of an upright bar or cylindrical rod which is provided in its upper end with a socket 210 for the reception of the clincher block. This bar is provided with a vertical split 211 which divides the socket into two jaws 212, 212 which are drawn together by a screw 213 so as to grip the clincher block between them and hold the same in place. At its lower end the clincher holder is mounted on an upright post or column 214 which is pivoted at its lower end on the front part of the frame base so that the clincher block can be moved into and out of an operative position relative to the staple forming and driving position. For this purpose the lower end of the post is removably secured in a socket 215 formed on the upper part of a rocking bracket 216 which is pivoted on the base by a pair of pins or pintles 217 mounted on upwardly projecting lugs 218 on the base and having conical ends 219 engaging conical seats 220 on opposite sides of this bracket, as shown in Fig. 9. The post is of tubular form and the lower end of the clincher holding bar is mounted in this post so that it can be adjusted vertically for adapting the clincher block to work on different thicknesses and also permitting the clincher block to yield and avoid breaking or cramping any of the parts in case an abnormal or excess pressure is applied to the staple and the work during the operation of stitching or stapling the same. The means for this purpose are best shown in Figs. 1, 2, 4, 5 and 9 and constructed as follows:

The numeral 221 represents a vertical guide sleeve which has its lower part arranged in the upper part of the tubular post and the interior of which receives the lower end of the clincher holding bar. The numeral 222 represents an adjusting sleeve which has its lower end connected by a screw joint 223 with the exterior of the post at the upper end thereof and engages its upper end with a downwardly facing annular shoulder 224 on the exterior of the upper end of the guide sleeve 221, as shown in Fig. 9. Upon turning the adjusting sleeve in one direction the guide sleeve and the clincher bar mounted therein will be raised and upon turning this adjusting sleeve in the opposite direction this guide sleeve and the clincher bar will be lowered by gravity. After adjustment the adjusting sleeve is held in place by an internally screw threaded clamping ring 226 engaging with the upper threaded end of the post and bearing against the lower end of the adjusting sleeve. Within the lower part of the guide sleeve 221 is arranged an abutment or stop block 227 which is secured thereto by a transverse pin 228. Within this guide sleeve and interposed between the lower end of the clincher holding bar and the upper end of the abutment block 227 is arranged a spring 229 which operates to hold this bar and the clincher block yieldingly in its highest position relative to the guide sleeve, the limit of the upward movement of the clincher bar in this guide sleeve being effected by a pin 230 passing transversely through the lower part of this bar and through vertical slots 231 in the guide sleeve and engaging with the upper ends of these seats, as shown in Fig. 9. When excess pressure is applied to the clincher block during the staple driving operation, the clincher bar slides downwardly in the guide sleeve 221 and compresses the spring 229, and when this pressure is removed the expansion of this spring lifts the clincher bar until its stop pin 230 again engages the stop shoulders formed by the upper ends of the slots 231 in the guide sleeve. The opposite ends of the pin 230 project through longitudinal slots 232 in the adjacent part of the post, thereby preventing the clincher bar and block from turning in the post and maintaining the clincher block always in the proper position for operating on the legs of the staples and bending or clinching the same against the underside of the work which is being stitched.

This clincher block is mounted on the main frame of the machine so as to be movable toward and from its normal operative position under the staple forming and driving mechanism. Some operators prefer to have the clincher block arranged in front of the operative position while placing the work piece, such as a corrugated paper box, on the clincher block and removing the same therefrom, but other operators prefer to have the clincher block, while idle, arranged in its operative position beneath the forming and driving mechanism. Means are therefore provided for rocking the post in accordance with either of these preferences, those shown in Figs. 2, 4, 5 and 6 being organized for moving the clincher supporting post manually from a forwardly inclining idle position to a rearward upright operative position relative to the forming and driving mechanism and then moving this clincher supporting post automatically from the forming and driving position forwardly to an idle work applying and removing position. As shown in these figures this mechanism is constructed as follows:

The numeral 234 represents a vertical arm projecting downwardly from the bracket 216 into the frame base which is made hollow for this purpose and 235 represents a horizontal arm projecting rearwardly from this bracket into said hollow base. The post is moved into a forwardly inclined position by a spring 236 connected at its front end with a pin 237 on the depending arm 234 and at its rear end to a fixed abutment such as the pin 238 mounted on the inner part of the base.

Journaled horizontally and transversely in the right side of the base is a clincher operating shaft 239 which is provided at its inner end with a forwardly projecting rock arm 240 having a laterally projecting pin 241 adapted to engage a rearwardly opening recess, notch or fork 242 at the rear end of the shifting arm 235 of the post supporting bracket. This operating shaft has its outer end connected with an L-shaped foot lever or treadle which latter has a rear longitudinal arm 243 arranged along the right side of the base and connected at its rear end with the outer end of the operating shaft 239, and a front arm 244 projecting transversely from the front end of the longitudinal arm 243 across the front of the base and the transverse arm of the clutch operating treadle, as shown in Figs. 1, 2 and 3. Upon turning the operating shaft 239 so that its arm 240 moves downwardly, the pin 241 of this arm, by engaging the recess 242 of the shifting arm 235 will cause the post to be turned rearwardly, and upon releasing this shaft the spring 236 will turn the post forwardly.

The longitudinal arm 243 of the post shifting treadle is adjustable forwardly and backwardly relatively to the post operating shaft 239 to suit the operator and enable him to use the heel and toe of his foot on the cross arms 56, 244 of the clutch and post shifting treadles and actuating these parts alternately as required during the operation of the machine. The adjustable connection between the longitudinal arm 243 of the post shifting treadle and the outer end of the operating shaft 239 is the same as that employed between the clutch rock shaft 58 and the clutch treadle, except that the connection is reversed, and the same description and identifying characters are therefore employed on the corresponding parts. Means are employed for adjusting the limit of the rocking movement of the post in both directions, the forward tilt of the same being limited by an adjustable stop screw 245 mounted on the upper part of the base and adapted to be engaged by the upper side of the horizontal arm 235, and the rearward straightening movement being limited by an adjustable stop screw 246 mounted on the front part of the base and adapted to be engaged by the depending arm 234 of the post supporting bracket.

If an operator prefers to have the clincher block stand normally in an operative vertical position below the staple forming and driving mechanism and move under manual operation forwardly into an inclined position for placing a box or other workpiece to be stapled on the clincher block and removing the same therefrom, the post rocking or shifting mechanism, as shown in Figs. 7 and 8, is organized as follows:

The pin 241 is disengaged from the recess or notch 242 and the arm 240 is removed from the shaft 239, and then this arm is reversed and resecured to the shaft in a position in which it depends therefrom and the pin 241 projects away from the fork 242, as shown in Fig. 7. A longitudinal link 247 is then attached at its front end to the pin 237 on the depending arm 234 of the post bracket 216 and the rear end of this link is connected with the pin 241 of the depending rock arm 240, as shown in Fig. 7. The spring 236 is detached at its front end from the pin 237 on the depending bracket arm 234 and also detached at its rear end from the stationary frame pin 238 and this spring is connected at its front with a stationary pin 248 on the front part of the base while its rear end is attached to the pin 241 of the depending rock arm 240. In this rearrangement of the post shifting mechanism the spring 236 operates to turn the clincher supporting post in a direction for bringing the clincher block into a vertical rearward operative position below the staple former and driver, but when the respective treadle is depressed by the foot of the operator the clincher supporting post will be tilted forwardly and carry the clincher block away from underneath the staple former and driver. The same parts of the post shifting means, excepting the link 247, are therefore employed for operating this post in accordance with either arrangement as bests suits the convenience or wishes of the operator.

Some kinds of wire stapling or stitching work can be more advantageously done by supporting a clincher block 491 on the front end of a clincher arm 249 which is pivoted at its rear end on the standard 38 of the main frame so that this arm can either be folded downwardly into a pendant inoperative position relative to its standard when the same is not used, as shown by full lines in Fig. 12, and can also be swung upwardly into an operative position in which it projects forwardly from the standard, as shown by full lines in Fig. 10 and by dotted lines in Fig. 2. The clincher block 491 is secured by a screw 492 in a socket 493 in the clincher arm and the face of this block is suitably formed to clinch the staple in the manner shown in Fig. 31, or in any other approved manner. The means for pivoting the clincher arm on the main frame comprise two horizontal pivot pins or pintles 250 mounted on the frame standard and having conical inner ends 251 which engage with correspondingly shaped seats 252 on opposite sides of the rear end of the clincher arm, as shown in Fig. 11.

Means are provided for quickly and conveniently locking the clincher arm in either its horizontal operative position, or in its vertical inoperative position which means are constructed as follows:

The numerals 253 and 254 represent lower and upper arms of a locking lever arranged in rear of the axis of the clincher arm and pivoted to this arm by a horizontal transverse pin 255 normally arranged below the axis of the clincher arm and parallel thereto. The front side of the lower arm 253 of this locking lever is engaged by an adjusting screw 256 which works in a lug 257 depending from the rear end of the clincher arm. Between the front side of the upper arm 254 of the locking lever and the adjacent rear end of the clincher arm is arranged a spring 258 which operates to keep the lower arm 253 of this lever in engagement with said adjusting screw.

The upper arm 254 of the locking lever is provided with a working locking face 259 which is turned upward when the clincher arm is in its horizontal operative position, as shown in Fig. 10, and an idle locking face 260 which is turned rearwardly when the clincher arm is in its inoperative pendant position, as shown in Fig. 12. A vertically turning retaining block 261 is provided which is pivoted by a horizontal transverse shaft 262 on the frame standard and provided on its opposite ends, outside of the standard, with knobs or finger pieces 263 so that the retaining block can be turned from either side of the machine. When the clincher arm is in a horizontal operative position the same may be held against downward movement by turning the retaining block into a pendant position in which its free end engages the upwardly turned face 259 of the locking lever, as shown in Fig. 10, and when the clincher arm is in its pendant inoperative position, the retaining block may be turned upwardly into a forwardly projecting position into engagement with the rearwardly turned upright locking face 260 of the locking lever, as shown in Fig. 12, thereby permitting of holding the clincher arm reliably in either of these positions. When the clincher arm is in its horizontal position the same may be turned independently of the locking lever by means of the adjusting screw 256 in order to support the clincher block accurately on its front end in relation to the staple former and driver mechanism with which it cooperates.

The lower end of the post is detachably secured in the socket 215 of the bracket 216 so that the post can be removed when it is desired to use the clincher arm 249 in its stead. The means for this purpose preferably consist in providing the socket 215 on one side with a vertical split 264 and connecting the parts of the socket on opposite sides of this split by a clamping screw 265, as best shown in Figs. 2 and 9. In order to insure assembling the clincher post and the bracket in the correct relation for properly presenting the clincher block to the staple former and driver, the lower part of the clincher post is provided with a locating projection 266 having preferably the form of a screw which engages with a locating notch 267 in the upper edge of the socket wall, as shown in Figs. 3 and 9.

The pintles 217 of the clincher post and the pintles 250 of the clincher arm are adjustable transversely on the frame to permit of accurately alining the clincher block on this post and arm relative to the staple forming and driving mechanism.

If desired the clutch treadles may be adjusted for bringing the clutch shifting treadle in rear of the clincher post shifting treadle, or vice versa, to enable the operator to depress either of these treadles by the toe or by the heel of the foot, as best suits his convenience.

We claim as our invention:

1. A wire staple forming and driving machine comprising a reciprocating former adapted to bend the legs of the staples, a reciprocating driver for driving the staples through objects, and an anvil mechanism which supports the staple blanks during the operation of bending the legs thereof and which comprises an anvil lever movable toward and from the front side of the former and driver and having a lower anvil jaw, a clamping bar slidable vertically on the inner side of the anvil lever and provided with a clamping jaw adapted to cooperate with said anvil jaw for gripping the staple blanks and carrying the same to said former and driver, and means for adjusting the limits of the forward and backward movements of said anvil lever.

2. A wire staple forming and driving machine comprising a reciprocating former adapted to bend the legs of the staples, a reciprocating driver for driving the staples through objects, and an anvil mechanism which supports the staple blanks during the operation of bending the legs thereof and which comprises an anvil lever movable toward and from the front side of the former and driver and having a lower anvil jaw, a clamping bar slidable vertically on the inner side of the anvil lever and provided with a clamping jaw adapted to cooperate with said anvil jaw for gripping the staple blanks and carrying the same to said former and driver and means for actuating said clamping bar including a rock lever pivoted adjacent to the inner side of the anvil lever to swing in a vertical plane perpendicular to the plane of movement of said anvil lever and having one of its arms connected with said clamping bar, a clamp operating cam arranged on the former slide and adapted to engage the other arm of said rock lever, and means for adjusting the limits of the forward and backward movements of said anvil lever.

3. A wire staple forming and driving machine comprising a reciprocating former adapted to bend the legs of the staples, a reciprocating driver for driving the staples through objects, an anvil whereby the staples are presented to said former and driver, an anvil lever having a lower arm which carries said anvil and also having an upper arm, spring means for moving the anvil away from said former and driver, an adjustable stop for limiting the movement of said anvil away from said former and driver consisting of a screw arranged on the upper arm of said lever and adapted to engage the driver, and means for moving said anvil toward said former and driver and comprising a cam movable with said driver and a screw adapted to be engaged by said cam and adjustable on the upper arm of said lever for adjusting said anvil relative to said former and driver, the upper arm of said lever being split and the split parts thereof being connected by a clamping screw.

4. A wire stapling machine comprising a former and driver, a wire feeding and cutting mechanism, and anvil means for carrying the wire blanks from said feeding and cutting mechanism to said former and driver including a lever having an arm provided with a slot in its outer side, a wall on its inner side and anvil jaws on opposite sides of said slot for supporting a wire blank on its underside, a spring block secured in said slot, a clamping bar sliding between said wall and spring block and provided with a jaw engageable with the upper side of said wire blank for holding the same against said lower anvil jaws, spring means interposed between said spring block and clamping bar for moving the latter in the direction for gripping the wire blank between said anvil jaws and the clamping jaw, and means for adjusting the limits of the movements of said anvil means in opposite directions.

5. A wire staple forming and driving machine comprising a reciprocating former adapted to bend the legs of the staples, a reciprocating driver for driving the staples through objects, and means for supporting the staples during the driving operation comprising a shoe movable into and out of a position within the staples and pivoted to turn vertically on said former, and spring shifting means bearing against a stationary abutment and having a connection with said shoe which is eccentric to its axis and said spring means moving said shoe toward the former and driver when the former has descended to a position in which the eccentric connection is below a line extending from said abutment to the axis of said shoe and moving said shoe away from the former and driver when the former has ascended to a position in which said eccentric connection is above said line.

6. A wire staple forming and driving machine comprising a reciprocating former adapted to bend the legs of the staples, a reciprocating driver for driving the staples through objects, and means for supporting the staples during the driving operation comprising a shoe movable into and out of a position within the staples and pivoted to turn vertically on said former, and spring shifting means bearing against a stationary abutment and having a connection with said shoe which is eccentric to its axis and said spring means moving said shoe toward the former and driver when the former has descended to a position in which the eccentric connection is below a line extending from said abutment to the axis of said shoe and moving said shoe away from the former and driver when the former has ascended to a position in which said eccentric connection is above said line, said abutment being pivoted on a stationary part of the machine and said spring shifting means including a shifting rod pivoted at one end on said eccentric connection and sliding at its opposite end on said abutment, and a spring surrounding said shifting rod and bearing at its opposite ends against shoulders on said shifting rod and abutment.

7. A wire staple forming and driving machine comprising a reciprocating former adapted to bend the legs of the staples, a reciprocating driver for driving the staples through objects, and means for supporting the staples during the driving operation comprising a shoe movable into and out of a position within the staples and pivoted to turn vertically on said former, and spring shifting means bearing against a stationary abutment and having a connection with said shoe which is eccentric to its axis and said spring means moving said shoe toward the former and driver when the former has descended to a position in which the eccentric connection is below a line extending from said abutment to the axis of said shoe and moving said shoe away from the former and driver when the former has ascended to a position in which said eccentric connection is above said line, said spring shifting means including a shifting rod sliding at one end on said abutment and pivoted at its other end on said eccentric connection, and a spring interposed between shoulders on said shifting rod and abutment.

8. A wire staple forming and driving machine comprising a movable anvil for presenting the staple blanks, and means for cutting the wire blanks from a continuous length of wire including a main carrier block, a normally stationary cutter mounted on said carrier block, a movable cutter mounted on said main carrier block and cooperating with said normally stationary cutter for severing blanks of wire from said continuous length of wire, an auxiliary carrier block on which said main carrier block is adjustably mounted, a stationary support on which the auxiliary carrier block is guided, means for adjusting said auxiliary carrier block on said support, and means for adjusting the limits of movements in opposite directions of said anvil.

9. A wire staple forming and driving machine comprising a movable anvil for presenting the staple blanks, and means for cutting the wire blanks from a continuous length of wire including a main carrier block, a normally stationary cutter mounted on said main carrier block, a movable cutter mounted on said main carrier block and cooperating with said normally stationary cutter for severing blanks of wire from said continuous length of wire, an auxiliary carrier block on which said main carrier block is adjustably mounted, a stationary support on which the auxiliary carrier block is guided, means for adjusting said auxiliary carrier block on said support, and means for adjusting the main carrier block on said auxiliary carrier block comprising an internal partial screw thread formed on one side of a recess in said auxiliary carrier block, a rotary adjusting screw mounted on said main carrier block and engaging one side with said internal screw thread, means for permitting rotation of said screw on said main carrier block but preventing lengthwise movement of the same, and means for adjusting the limits of movements in opposite directions of said anvil.

10. A wire staple forming and driving machine comprising a movable anvil for presenting the staple blanks, and means for cutting the wire blanks from a continuous length of wire including a main carrier block, a normally stationary cutter mounted on said main carrier block, a movable cutter mounted on said main carrier block and cooperating with said normally stationary cutter for severing blanks of wire from said continuous length of wire, an auxiliary carrier block on which said main carrier block is adjustably mounted, a stationary support on which the auxiliary carrier block is guided, means for adjusting said auxiliary carrier block on said support, and means for adjusting the main carrier block on said auxiliary carrier block comprising an internal partial screw thread formed on one side of a recess in said auxiliary carrier block, a rotary adjusting screw mounted on said main carrier block and engaging one side with said internal screw thread, means for permitting rotation of said screw on said main carrier block but preventing lengthwise movement of the same including a retaining screw mounted on said main carrier block and provided with a pin projecting into an annular groove on said adjusting screw, and means for adjusting the limits of the movements in opposite directions of said anvil.

11. A wire staple forming and driving mechanism comprising a main frame, a staple former, a staple driver, a movable anvil mechanism for presenting staple blanks to said former and driver, and means for severing staple blanks from a continuous length of wire including a main carrier block guided on the frame and movable toward and from said anvil mechanism, a relatively stationary wire cutter mounted on said main carrier block, a cutter slide guided on the main carrier block, a relatively movable cutter mounted on said slide and cooperating with said stationary cutter for severing wire, an auxiliary carrier block having sliding engagement with said main carrier block, means for adjusting the main and auxiliary blocks one relative to the other, a shifting slide arranged in rear of the main frame, pins connecting said shifting slide and auxiliary carrier block and passing through enlarged openings in said main carrier block, cam means for actuating said shifting slide, and means for adjusting the limits of the movements of said anvil mechanism in opposite directions.

WILLIAM O. SIMS.
EDWARD J. RODDA.